United States Patent [19]
Sharon

[11] 3,913,582
[45] Oct. 21, 1975

[54] LASER DEVICE WITH ARTICULATED ARM

[75] Inventor: Uzi Sharon, Tel-Aviv, Israel

[73] Assignee: Laser Industries Ltd., Ramat-Aviv, Israel

[22] Filed: Oct. 17, 1973

[21] Appl. No.: 407,047

[30] Foreign Application Priority Data
Oct. 17, 1972  Israel.................................... 40603

[52] U.S. Cl. .......................................... 128/303.1
[51] Int. Cl.² ........................................ A61B 17/36
[58] Field of Search ............ 128/303 R, 303.1, 395; 331/94.5

[56] References Cited
UNITED STATES PATENTS

| | | | |
|---|---|---|---|
| 3,348,547 | 10/1967 | Kavanagh................. | 128/303.1 UX |
| 3,481,340 | 12/1969 | McKnight et al. .................. | 128/395 |
| 3,703,176 | 11/1972 | Vassiladis et al. .................. | 128/395 |
| 3,720,213 | 3/1973 | Hobart et al........................ | 128/395 |

*Primary Examiner*—Lawrence W. Trapp
*Attorney, Agent, or Firm*—Pennie & Edmonds

[57] ABSTRACT

Apparatus for conducting a laser beam from a laser, through an articulated arm, to an output device, said apparatus being constructed so that the output device is easily maneuvered. In one embodiment, a beam from a laser mounted on an optical bench is directed to a first mirror that reflects the beam upward along the axis of a vertical shaft. At the top of the shaft, a second mirror, mounted on a conical bearing and rotatable about the axis of the vertical shaft, reflects the laser beam along the axis of a horizontal sleeve to a third mirror that is mounted on a sleeve bearing so that it is rotatable about the horizontal axis. In like fashion, the beam from the third mirror is successively incident on fourth, fifth, sixth, seventh, and eighth mirrors all of which are rotatable about the axis of the shaft down which the incident beam propagates. Finally, the beam from the eighth mirror enters the output device. The second through eighth mirrors are all mounted in the articulated arm and are interconnected by sleeve bearings and, in some cases, hollow tubes. The arm is supported by a counterbalancing system that is connected to the arm at a point between the third and fourth mirrors.

22 Claims, 5 Drawing Figures

LASER DEVICE WITH ARTICULATED ARM

BACKGROUND OF THE INVENTION

The present invention relates to laser devices, and particularly to laser devices useful as surgical instruments.

As is well known, a laser beam can be focused to a very small spot size such as 100 microns or less in diameter to produce a very hot concentration of light energy. At laser wavelengths such as 10.6 microns that are almost completely absorbed by the body, such a focused laser beam may be used to cut through most types of body tissues and bone. Accordingly, laser devices have been proposed for use in a variety of dental and surgical techniques such as the cleaning of abcesses and caries, endoscopic procedures, and the removal of tumors, burnt scar tissue and the like. The devices that have been proposed typically comprise a laser, an articulated arm and a series of mirrors mounted in this arm for directing a laser beam from the laser, along the axis of the arm, to a working area. These devices theoretically offer a number of advantages, particularly the advantage that a laser beam can make very clean and fine cuts while minimizing damage to tissues outside the cutting lines. Also, the laser beam readily coagulates capillaries and small veins and arteries, thereby minimizing loss of blood and keeping the working area clean. Moreover, because the laser tends to seal off blood vessels, the possible spread of malignant cells during extirpative surgery for malignant disease is reduced without precluding repair to the defect.

While numerous surgical lasers have been proposed, very few have actually been built and those that have been built have generally been used only in a laboratory environment. It has proven quite difficult to use such instruments in a clinical capacity because their articulated arms are very unwieldy: they are too bulky, heavy and awkward to use. While theoretically such articulated arms permit sufficient freedom of motion to permit all the movement that one might use while using a conventional scalpel, in practice they do not permit the precise control that is necessary in a critical surgical operation. In addition, balancing systems for these arms frequently are cumbersome and impractical for the crowded conditions around an operating table.

SUMMARY OF THE INVENTION

According to a broad aspect of the present invention, there is provided an improved laser device, particularly useful as a practical surgical instrument, comprising a laser, an articulated arm and several mirrors mounted in the articulated arm and arranged to successively reflect the laser beam to a working area. Compared to previous devices, the articulated arm is quite light in weight and highly maneuverable. As a result, the surgeon has available to him a practical laser scalpel that can be used as conveniently as a conventional scalpel. As will be evident to those skilled in the art, numerous other uses may readily be found for this device in applications far removed from surgery.

In one embodiment of the invention, a laser is mounted horizontally on an optical bench. A beam of electromagnetic radiation from the laser is directed horizontally to a first mirror whose position in the laser beam may be oriented to align the beam so that it propagates along the axis of the articulated arm. Once such alignment is completed, the position of this mirror is fixed with respect to the beam. This first mirror is set at an angle of approximately 45° with respect to the incident laser beam and is oriented to direct the laser beam upwards along the axis of a vertical shaft.

At the top of the shaft is a second mirror that is set at an angle of 45° with respect to the incident beam and is mounted on a conical bearing so that it may be rotated about the axis of the vertical shaft. The beam from the second mirror is then directed along the axis of a horizontal sleeve bearing to a third mirror that is also set at 45° with respect to the incident beam. This third mirror is mounted on the sleeve bearing so that it may be rotated about the horizontal axis.

In like fashion, the beam from the third mirror is successively incident on fourth, fifth, sixth, seventh, and eighth mirrors all of which are set at 45° with respect to the incident beam and are mounted on sleeve bearings so that they may be rotated about the axis of the shaft down which the incident beam propagates. Finally, the beam from the eighth mirror enters a manipulator that is used in directing the beam into a working area.

The second through eighth mirrors are all mounted in the articulaled arm and are interconnected by hollow sleeve bearings and, in some cases, hollow tubes. The arm is supported by a counterbalancing system that is connected to the arm at a point between the third and fourth mirrors. The counter-balancing system comprises an arm that is mounted above the second mirror at the top of the vertical shaft and may be rotated on a first axle that is parallel to the axis of the horizontal shaft between the second and third mirrors. The counterbalancing arm is connected to the articulated arm by a gimbal mounting. This gimbal mounting is secured to the counterbalancing arm by a second axle and to the articulated arm by a third axle, both of which are parallel to the first axle. The gimbal mounting is free to rotate about the portion of the articulated arm to which it is secured, a feature that decouples the moment of inertia of the arm from the counterbalancing system. The counterbalancing system also comprises a counterweight that is positioned so that the center of gravity of the counterbalancing system and the load it bears is located on the axis of the vertical shaft. As a result of this arrangement, substantially no weight is borne by the sleeve bearings on which the third mirror is rotated and accordingly wear is minimized. This ensures that the alignment of the laser beam with the axis of the articulated arm stays the same.

BRIEF DESCRIPTION OF THE DRAWING

These and other objects, features, and elements of my invention will become more readily apparent from the following detailed description of the drawing in which.

DETAILED DESCRIPTION OF THE DRAWING

Figure 1:
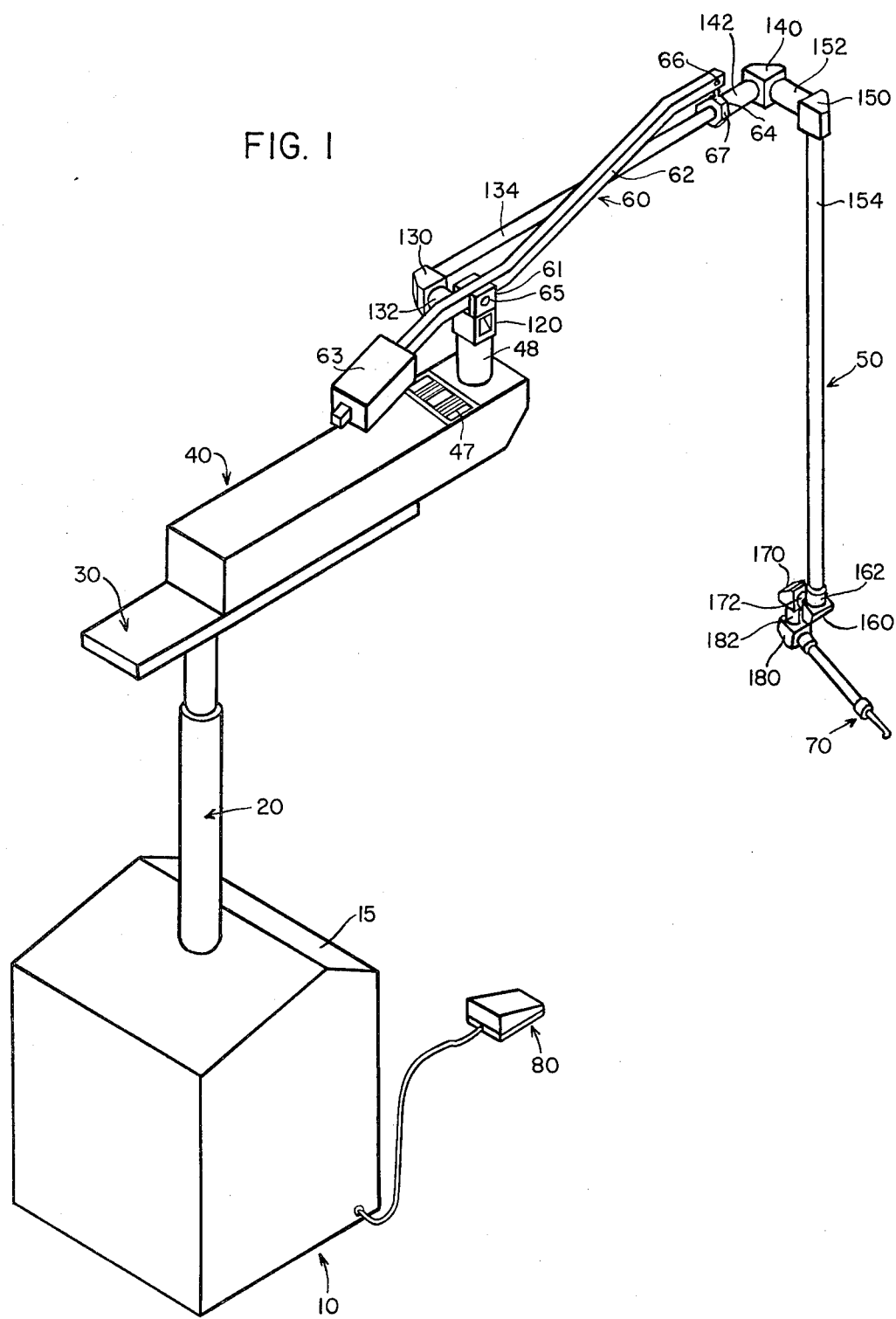
FIG. 1 is a perspective view of an illustrative embodiment of the laser device of the invention.
Figure 2:
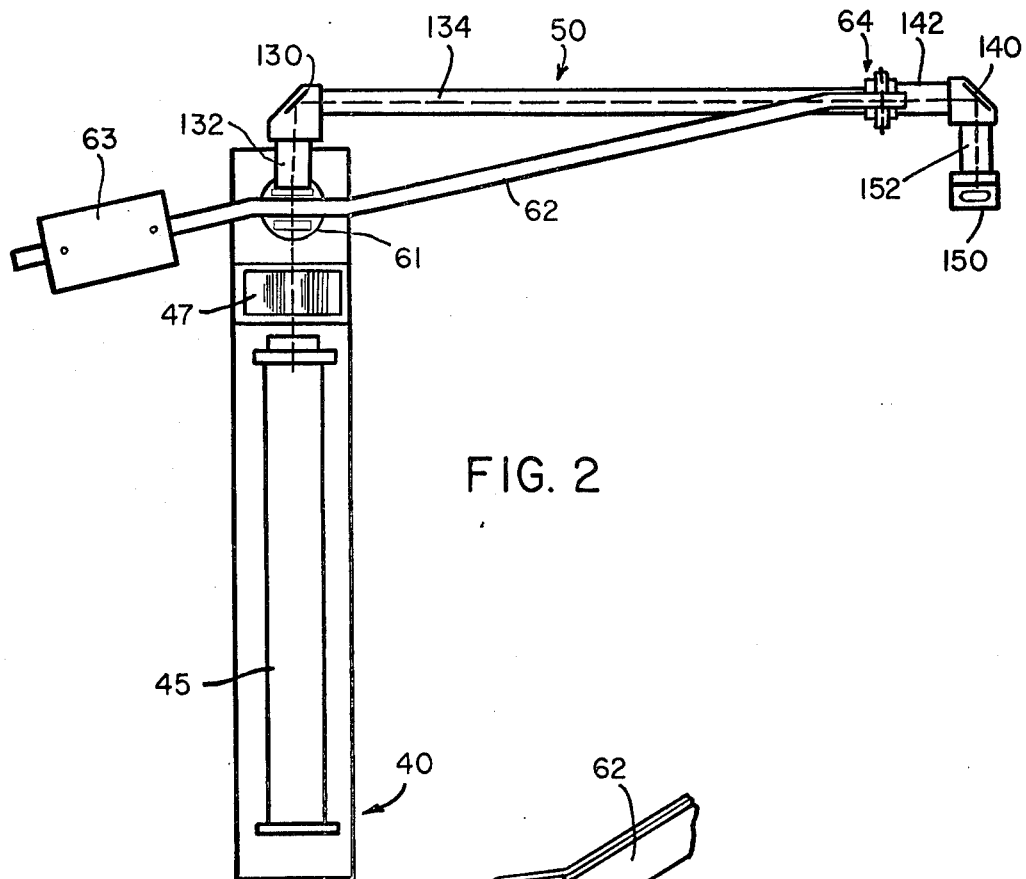
FIG. 2 is a top view of certain portions of the laser device of FIG. 1.

As shown in FIGS. 1 and 2, the illustrative laser device of the invention comprises a housing 10, a telescoping vertical shaft 20 connected to said housing, a horizontal member 30 connected to the top of shaft 20 and supporting a horizontally-movable carriage (not shown), an optical bench 40 mounted on said carriage and containing a laser 45, an articulated arm 50 mounted on a vertical shaft 48 on bench 40, a counterbalancing system 60 supporting articulated arm 50, a manipulator 70 at the end of arm 50, and a foot-operated switch 80 for controlling operation of the laser. Vertical shaft 48 and articulated arm 50 are hollow enclosures along the axes of which a laser beam from laser 45 is conducted to manipulator 70. A control panel 15 is located on housing 10, and the electronic apparatus, vacuum pump, and gas supply for the laser are located in housing 10. Tubing for the vacuum pump and gas supply to the laser and the necessary electrical connections are not shown in order to avoid undue complication to the drawing. For the same reason, the conventional details of telescoping shaft 20 and the mounting of the horizontally-movable carriage have been omitted.

In using this device, the position of the articulated arm is first adjusted by setting shaft 20 at the desired extension and positioning the carriage at a convenient overhead location. Controls are then set on panel 15 to specify the power output of the laser and, if desired, the duration of this output. In the alternative, the duration of the power output may be controlled by means of foot switch 80.

As indicated above, the laser beam is guided along the axis of articulated arm 50 to manipulator 70 by a series of mirrors mounted in the arm. Housings 120, 130, 140, 150, 160, 170, 180 for these mirrors are shown in FIG. 1 and in the cross-sectional view of FIG. 5. Mirror housings 130–180 are mounted on hollow sleeve bearings 132, 142, 152, 162, 172, 182, respectively. Because it is possible to rotate each mirror about the axis of the sleeve bearing on which it is mounted, it is possible to vary the positions of the mirrors relative to one another; and therefore it is possible to maneuver the laser beam so as to vary both the position and the direction of the laser beam leaving the last mirror. In addition to providing for rotation of the mirrors about the axis of the sleeve bearing, these bearings also provide for the support of the mirror housings in articulated arm 50. An extending tube 134 connects mirror housing 130 to sleeve bearing 142 and an extending tube 154 connects mirror housing 150 to sleeve bearing 162.

To minimize the weight and bulk of the articulated arm, all the sleeve bearings are high precision bearings with close tolerances; and, as will be detailed below in conjunction with FIG. 4, convenient means are provided for aligning the laser beam accurately with the axis of the articulated arm. As a result, it is possible to use in the articulated arm mirrors, bearings, and tubes having considerably smaller diameters (and therefore less weight) than those of presently available equipment.

Figure 3:
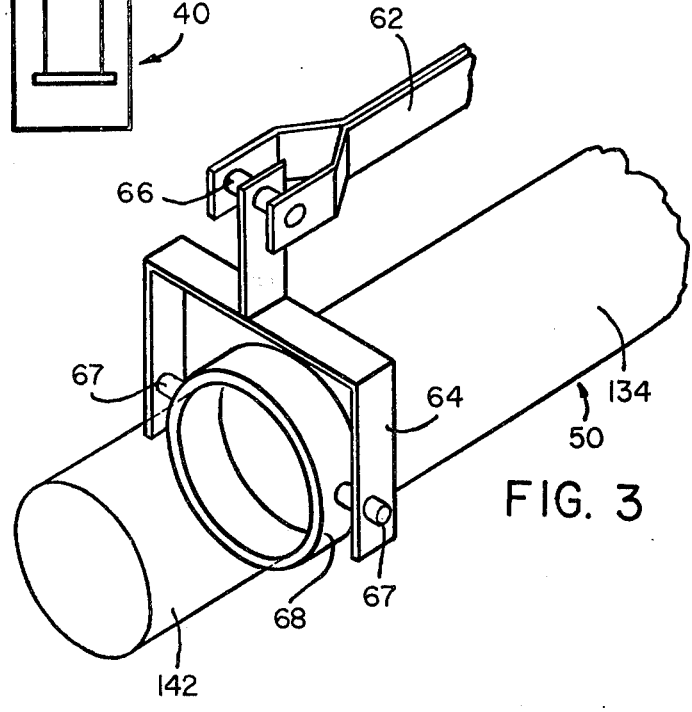
FIG. 3 is a perspective view of a gimbal mounting shown in FIG. 1.

In addition, articulated arm 50 is extremely well balanced by counterbalancing system 60. This system comprises a mounting means 61, an arm 62, a counterweight 63, and a gimbal mounting 64. Counterbalancing arm 62 is mounted in mounting means 61 on an axle 65 that is parallel to the axis of sleeve bearing 132 and the direction of the laser beam within it. As shown most clearly in FIG. 3, gimbal 64 is mounted in counterbalancing arm 62 on a second axle 66 that is parallel to axle 65. Articulated arm 50 is mounted in gimbal 64 in a sleeve 68 that pivots on a third axle 67 that is parallel to axle 65. Sleeve 68 in gimbal 64 is free to rotate about the longitudinal axis of extending tube 134, a feature that decouples the rotational moment of inertia of the counterbalancing system about tube 134 from that of the articulated arm. To prevent binding of the counterbalancing system and the articulated arm, axles 66 and 67 are loosely mounted in their housings so that there is some play in their positions. Accordingly, these axles are only approximately parallel.

Figure 4:
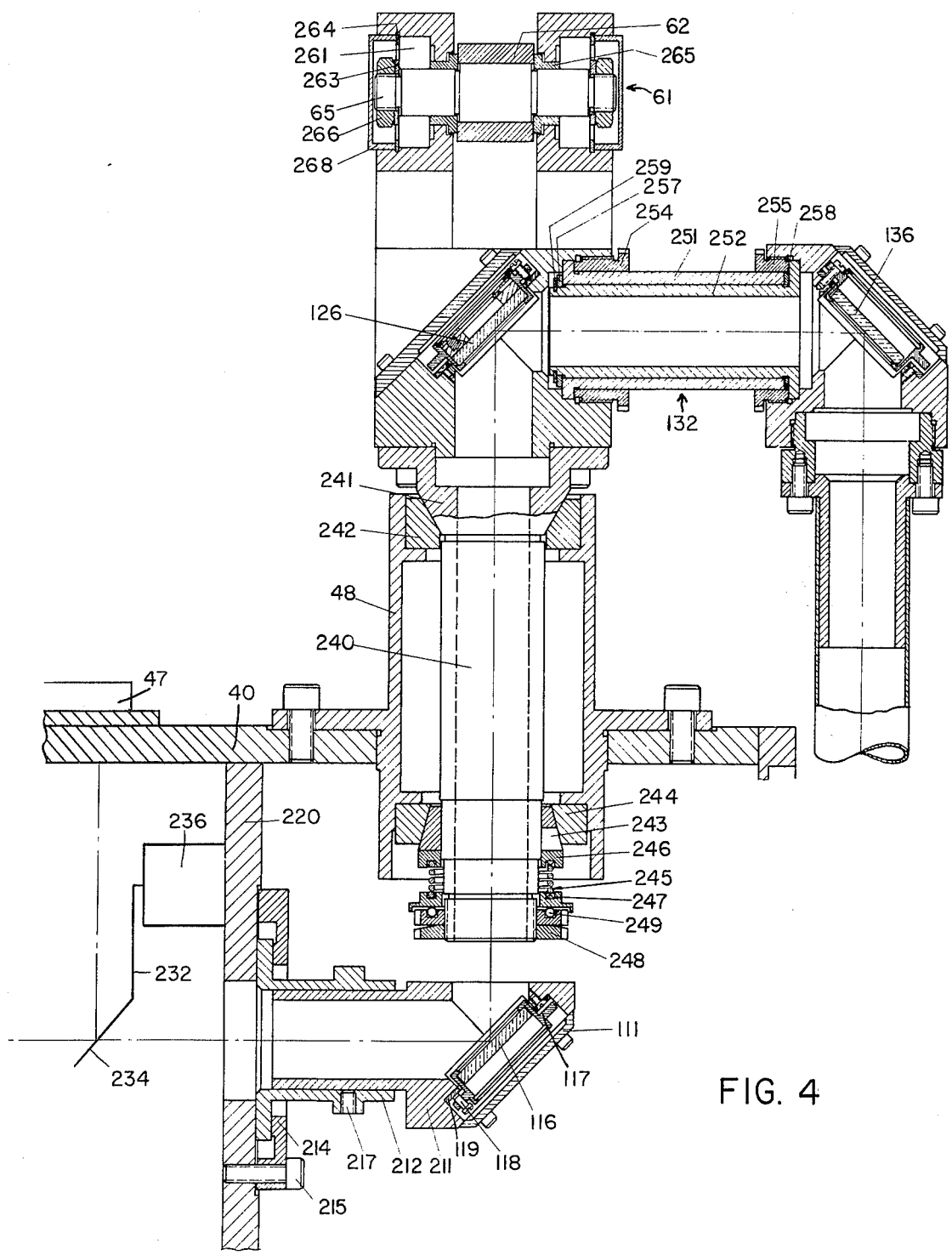
FIG. 4 is a cross-sectional view of the alignment mirror, the vertical shaft and a portion of the articulated arm of the apparatus of FIG. 1.

As shown in FIG. 4, axle 65 on which counterbalancing arm 62 pivots, is centered on the axis of vertical shaft 48. In addition, counterbalancing weight 63 is positioned so that the center of gravity of the counterbalancing system and the load it bears is in line with the axis of vertical shaft 48. Consequently, the load of the articulated arm and counterbalancing system is balanced even when articulated arm 50 is rotated about shaft 48 and/or extending tube 134 of arm 50 is moved up or down. As a result, the load on sleeve bearing 132 is minimized; there is substantially no lateral thrust on this bearing; and the wear on this bearing is therefore minimized. This makes it relatively easy to maintain the optical alignment of articulated arm 50.

Because the diameter of the passageway in articulated arm 50 is relatively small in order to reduce the bulk and weight of the articulated arm, it is important to ensure that the laser beam is properly aligned with the axis of the arm so that its direction of propagation is coincident with the axis. This alignment is accomplished, as shown in FIG. 4, by adjusting an aligning mirror 116 mounted in optical bench 40 so that the incident laser beam intersects the axis of vertical shaft 48 at the reflecting surface of the mirror at an angle such that a plane which bisects the angle between the laser beam and the axis is perpendicular to the mirror. For these conditions, the reflected laser beam will be coincident with the axis of the vertical shaft; and, because this shaft is the first part of the articulated arm, the laser beam will therefore be aligned with the axis of the articulated arm.

Mirror 116 is mounted in a conventional annular mirror mount 117 whose position can be varied by three equally-spaced adjusting screws 118 (only one of which is shown). These adjusting screws bear on a ring 119 of wear-resistant metal that is mounted on a sleeve 211; and they push against a bias supplied by three other adjusting screws (not shown) that are threaded into sleeve 211. Sleeve 211 mates with a second sleeve 212 that is secured by a clamp 214 and several equally-spaced screws 215 (only one of which is shown) to a vertical wall 220 that is rigidly connected to optical bench 40. Sleeve 211 may be moved longitudinally in sleeve 212 or may be rotated therein in the course of obtaining the proper alignment. Once this alignment is achieved, the position of sleeve 211 in sleeve 212 may be fixed by three set screws located in equally-spaced threaded shafts 217 (only one of which is shown). For purposes of alignment, sleeves 211 and 212 may be moved vertically and horizontally after loosening screws 215 and therefore clamp 214.

As a result of this arrangement, a coarse alignment of mirror 116 may be made by positioning sleeves 211, 212 in the desired position in clamp 214 and by positioning sleeve 211 in the desired lateral and angular relationship with respect to sleeve 212. A fine adjustment of the position of mirror 116 is then made by means of adjusting screws 118. Once the adjustment is complete, protective backing plate 111 may be screwed into place. Further adjustment of this system will rarely be necessary. Moreover, in those cases where it must be done, it can be readily accomplished by adjusting mirror 116.

On the left side of wall 220 in FIG. 4 is mounted a safety system for use in controlling the laser output. A blade 232 bearing an inclined surface 234 is mounted in the path of the laser beam to deflect an incident beam to a heat sink 47 located at the top of the optical bench. When the laser is not in use, blade 232 is positioned in the path of the laser beam to prevent any accidental transmission of the laser beam through the articulated arm. When it is desired to use the laser beam, a voltage is applied to solenoid motor 236 to move blade 232 out of the path of the laser beam.

Further details of vertical shaft 48, mirrors 126 and 136, and mounting means 61 are also shown in FIG. 4. Vertical shaft 48 comprises a tube 240 that is supported by first conical bearings 241, 242 and centered by second conical bearings 243, 244. In the second conical bearing, conical element 243 immediately surrounding tube 240 is thrust against conical element 244 by a spring 245 mounted in sleeves 246 and 247 and secured to tube 240 by a threaded nut 248. A ball bearing race 249 between spring mounting 247 and nut 248 facilitates rotation of tube 240 in vertical shaft 48. Although all the weight of articulated arm 50 and counterbalancing system 60 is borne by conical bearing 241, 242, the resulting wear on this bearing has substantially no effect on the alignment of the articulated arm because the conical shape of bearing 241, 242 in cooperation with bearing 243, 244 provides continuous self-alignment. To permit such continuous self-alignment during wear, conical element 243 is made with notches in its upper and lower surfaces so that it contracts radially in the presence of the upward axial force supplied by spring 245.

Mirror 126 is located directly above mirror 116 and is rotatable about the axis of the vertical shaft. Mirror 126 has a conventional mounting in its housing that is similar to the mounting of mirror 110 in sleeve 211 and will not be described further. Mirror 136 is mounted in the same horizontal plane as mirror 126, again by means of conventional mountings. The criterion for alignment of these mirrors is the same as that of mirror 116 and the other mirrors in articulated arm 50: the direction of propagation of the laser beam reflected from the mirror should be coincident with the axis of the bearing or tube down which it is directed.

Mirror 136 may be rotated about the incident laser beam by means of sleeve bearing 132. Sleeve bearing 132 comprises first and second sleeves 251, 252, threaded retaining elements 254, 255, Teflon bearing rings 257, 258 and a retaining ring 259. In addition to permitting rotation of mirror 130 through a full circle, the elements of sleeve bearing 132 also ensure that bearing 132 remains substantially perpendicular to vertical shaft 48.

Mounted above mirror 126 on vertical shaft 48 is mounting means 61 for counterbalancing system 60. Arm 62 is mounted on an axle 65 that is parallel to the axis of sleeve bearing 132 and the direction of propagation of the laser beam from mirror 126 to mirror 136. Axle 65 is mounted in a bearing 261 that is secured in place in mounting 61 by washers 263, 264, spacers 265, nuts 266 threaded onto the two ends of axle 65, and a covering 268.

Figure 5:
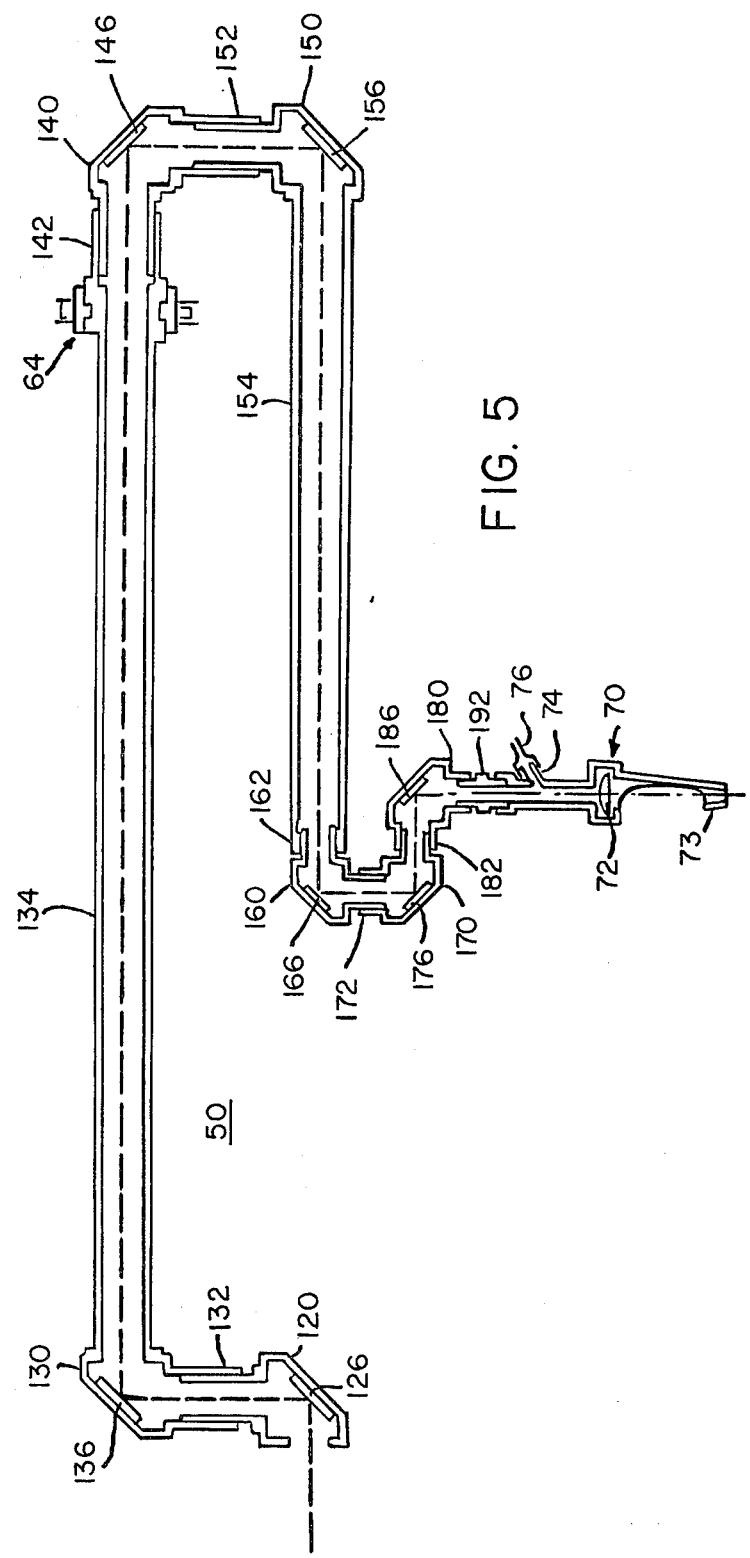
FIG. 5 is a schematic cross-sectional view of the articulated arm of the apparatus of FIG. 1.

Further details of the construction of articulated arm 50 and manipulator 70 are shown in the partially schematic cross-section of FIG. 5. For purposes of this illustration, the articulated arm is laid out in two dimensions and all the mirrors in the arm are positioned so that they are perpendicular to the plane of the drawing. It will be recognized that it would be necessary to disconnect the counterbalancing system from the articulated arm to obtain this relationship of the components of the arm.

As indicated in connection with FIG. 4, mirrors 126 and 136 are mounted in mountings 120, 130 by conventional means and may be rotated about a bearing axis along which propagates the laser beam incident on them. Mirrors 146, 156, 166, 176, 186 are likewise mounted by conventional means in mountings 140, 150, 160, 170, 180, respectively, and may be rotated about the axis of sleeve bearings 142, 152, 162, 172, 182, respectively. To avoid undue complication of FIG. 5, details of these mirror mounts and bearings have been omitted and the reader is referred to FIG. 4 for the details of illustrative such elements. It will be recognized, however, that the types of mountings and sleeve bearings used for these different mirrors may vary and that it may be desirable to use smaller mountings and bearings at the manipulator end of the articulated arm. Numerous conventional mountings and bearings are available for this purpose. To align the arm, each of the mirrors 126₁186 is aligned so that the laser beam incident on it is reflected down the axis of the following sleeve bearing. In the particular embodiment shown in FIG. 5, all angles between the incident and reflected beams are 90° and the mirrors are accordingly set at 45° to the incident beam with the plane that bisects the angle between the incident and reflected laser beams perpendicular to the reflecting surface of the mirror.

the mountings are connected to the adjacent mountings by intervening sleeve bearings. The connections between mountings 130 and 140 and between mountings 150 and 160 also include extending tubes 134 and 154, respectively. The axis of each extending tube is aligned with the axis of the sleeve bearing to which it is connected as shown in FIG. 5. Gimbal 64 in counterbalancing system 60 is connected to articulated arm 50 at one end of tube 134.

As is also indicated in FIG. 5, a laser beam incident on mirror 126 is successively reflected by mirrors 136, 146, 156, 166, 176, 186 through articulated arm 50 until it finally exits arm 50 along the axis of another sleeve bearing 192 and enters manipulator 70. Because the mirrors are aligned so that the laser beam propagates along the axis of each of the sleeve bearings, the position of the beam with respect to the input to manipulator 70 is not changed by rotation of any of the mirrors in its associated sleeve bearing. Upon leaving the articulated arm, the laser beam propagates along the axis of the manipulator and is focused by a lens 72 to a point where the laser energy is desired.

To reduce splattering of vaporized tissue and blood on manipulator 70, it is desirable to establish a positive gas pressure at the working end 73 of manipulator 70. This may readily be accomplished by providing manipulator 70 with a port 74, over which is fitted a gas supply hose 76. Passageways (not shown) are provided for the communication of the gas from the port 74 around lens 72 to working end 73 of the manipulator. In the past, it has been customary to use air pressure to supply this positive gas pressure; however, experience indicates that an inert gas such as nitrogen, helium, neon, argon and the like is preferable.

The particular manipulator that is shown is only illustrative and many other manipulators may readily be inserted into the open end of sleeve bearing 192. Several such manipulators are described in U.S. Pat. No. 3,865,113 entitled "Laser Device Particularly Useful as a Surgical Scalpel" and U.S. Pat. No. 3,865,114 entitled Laser Device Particularly Useful as a Surgical Instrument.

As will be obvious to those skilled in the art, numerous variations and modifications may be made in the above-described apparatus without departing from the spirit and scope of the invention. Although mirrors are preferred, other means for redirecting the laser beam may be used. Similarly, although each mirror in the articulated arm preferably is mounted so that it can only be rotated about the axis of the shaft down which the incident beam propagates, it is possible to use one or more mirrors having more than one degree of freedom. See, for example, A. D. Beach, "A Laser Manipulator for Surgical Use," *Journal of Scientific Instruments*, Ser. 2, Vol. 2, No. 11, pp. 931–932 (November 1969). The laser beam that is used may be one in which its energy increases toward its center, or the beam may have a different cross-section such as an annulus for a purpose such as that set forth in the above-identified second copending application.

In one embodiment of the invention, the spacing between mirrors 126 and 136 and between mirrors 146 and 156 is approximately 9.6 centimeters. The spacing between mirrors 136 and 146 is approximately 70 centimeters, and the spacing between mirrors 156 and 166 is on the same order. The spacing between mirrors 166 and 176 and between mirrors 176 and 186 is as small as possible and typically is about 4.8 centimeters. While these spacings are presently preferred, other spacings may obviously be used. If desired, a telescoping arrangement may be provided in shaft 154. Numerous other variations in this apparatus will also be evident.

What is claimed is:

1. Apparatus for guiding a laser beam comprising:
    an articulated structure;
    a series of beam redirecting means supported by said structure and arranged to successively reflect said beam, said articulated structure providing means for varying the position of the beam redirecting means to vary at least one of the position and direction of the beam from the last of said beam redirecting means;
    means for rotating at least a portion of the articulated structure about a first axis;
    a supporting arm coupled at one point to said portion of the articulated structure that is rotatable about said first axis, said supporting arm being rotatable about a second axis spaced apart from and parallel to said first axis; and
    means for supporting both said articulated structure and said supporting arm.

2. The apparatus of claim 1 wherein said means for supporting the articulated structure and the supporting arm also provides for their rotation.

3. The apparatus of claim 1 wherein:
    the means for supporting the articulated structure and the supporting arm is a vertical shaft;
    said first axis is horizontal;
    said second axis is also horizontal and is intersected by the vertical axis of said vertical shaft; and
    the coupling between the supporting arm and the articulated structure comprises a mounting secured to said articulated structure, said structure being rotatable in said mounting about a third axis, and means for securing said mounting to said supporting arm and for rotating it about a fourth axis, said first, second, third, and fourth axes being approximately parallel.

4. The apparatus of claim 3 wherein a counterweight is attached to said supporting arm.

5. The apparatus of claim 4 wherein the center of gravity of said articulated structure, supporting arm and counterweight is approximately in line with the vertical axis of the vertical shaft.

6. The apparatus of claim 1 wherein the articulated structure is supported on a vertical shaft.

7. The apparatus of claim 6 wherein said vertical shaft contains a conical bearing.

8. The apparatus of claim 6 wherein the center of gravity of the load borne by the supporting arm is approximately in line with the axis of the vertical shaft.

9. The apparatus of claim 1 wherein the supporting arm is coupled to the articulated structure by a coupling that can rotate about the portion of the articulated structure to which it is secured, whereby the rotational moment of inertia of the supporting arm about said portion of the articulated structure is decoupled from the moment of inertia of the articulated structure.

10. The apparatus of claim 9 wherein said mounting is rotatable on said articulated structure about an axis perpendicular to said first axis.

11. The apparatus of claim 1 further comprising:
    an adjustable mirror positioned in the path of the laser beam to direct said beam along a desired path in the articulated structure; and
    means for adjusting the position of the adjustable mirror so that a laser beam incident on the mirror at the point where said path intersects the mirror can be directed along said path, said adjustable mirror remaining fixed in position with respect to the laser beam and its source once the mirror is so adjusted.

12. The apparatus of claim 11 wherein the articulated structure comprises a series of interconnected hollow shafts and the desired path along which the laser beam is directed is along the axis of said shafts.

13. The apparatus of claim 11 wherein the desired path along which the laser beam is directed is the axis of rotation of a first rotatable element in said articulated structure.

14. The apparatus of claim 1 further comprising means for mounting a laser in approximately a horizontal position and for directing said laser beam to the first of the beam redirecting means supported by the articulated structure.

15. The apparatus of claim 1 wherein the articulated structure contains at least one sleeve bearing.

16. The apparatus of claim 1 wherein:
the means for supporting the articulated structure and the supporting arm is a vertical shaft;
the articulated structure comprises:
first means connected to said vertical shaft and rotatable about a horizontal axis;
second means connected to said first means and providing for rotation about an axis perpendicular to the horizontal axis of said first means; and
third means connected to said second means and providing for rotation about an axis perpendicular to said axis of said second means; and
the beam redirecting means are supported in the articulated structure to redirect the beam along the horizontal axis, said axis of said second means, and said axis of said third means.

17. The apparatus of claim 16 wherein:
the articulated structure further comprises fourth means connected to said third means and providing for rotation about an axis perpendicular to said axis of said third means; and
a beam redirecting means is supported in said articulated structure to redirect the beam along said axis of said fourth means.

18. The apparatus of claim 1 further comprising a surgical instrument attached to the end of the articulated structure.

19. The apparatus of claim 18 further comprising means for establishing with an inert gas a positive gas pressure at the operating end of the surgical instrument.

20. The apparatus of claim 3 wherein said mounting is rotatable about a portion of the articulated structure to which it is secured.

21. The apparatus of claim 3 wherein said mounting is rotatable on said articulated structure about an axis perpendicular to said first axis.

22. The apparatus of claim 3 wherein said vertical shaft is rotatable about its vertical axis and said first axis intersects said vertical axis.

* * * * *